(12) United States Patent
Kim

(10) Patent No.: US 10,602,446 B2
(45) Date of Patent: Mar. 24, 2020

(54) METHOD AND RECEIVING DEVICE FOR ESTIMATING RECEPTION TIME OF BEACON SIGNAL

(71) Applicant: FCI Inc., Seongnam-si, Gyeonggi-do (KR)

(72) Inventor: Won Man Kim, Seongnam-si (KR)

(73) Assignee: Dialog Semiconductor Korea Inc., Seoul (KR)

( * ) Notice: Subject to any disclaimer, the term of this patent is extended or adjusted under 35 U.S.C. 154(b) by 0 days.

(21) Appl. No.: 16/377,790

(22) Filed: Apr. 8, 2019

(65) Prior Publication Data
US 2019/0320387 A1 Oct. 17, 2019

(30) Foreign Application Priority Data

Apr. 12, 2018 (KR) .................. 10-2018-0042804

(51) Int. Cl.
| | | |
|---|---|---|
| *H04W 48/16* | (2009.01) | |
| *H04W 52/02* | (2009.01) | |
| *H04W 84/12* | (2009.01) | |

(52) U.S. Cl.
CPC ....... *H04W 52/0216* (2013.01); *H04W 48/16* (2013.01); *H04W 84/12* (2013.01)

(58) Field of Classification Search
CPC .. H04W 52/0216; H04W 48/16; H04W 84/12
USPC ...................................... 455/515
See application file for complete search history.

(56) References Cited

U.S. PATENT DOCUMENTS

| | | | | |
|---|---|---|---|---|
| 7,856,656 B1* | 12/2010 | Kharvandikar | ....... | H04W 12/12 370/230 |
| 8,005,515 B1* | 8/2011 | Chhabra | ........... | H04W 52/0229 455/574 |
| 8,125,951 B2* | 2/2012 | Gandham | ............. | H04W 48/16 370/329 |
| 8,488,506 B2* | 7/2013 | Husted | ............. | H04W 52/0293 370/311 |
| 8,745,248 B2* | 6/2014 | Yamaguchi | ......... | H04L 65/1069 709/228 |
| 8,942,201 B1* | 1/2015 | Duvvuri | ................ | H04W 56/00 370/329 |
| 9,124,604 B2* | 9/2015 | Yamaguchi | ......... | H04L 65/1069 |
| 9,125,152 B2* | 9/2015 | Zhu | .................... | H04W 52/0229 |
| 9,258,193 B2* | 2/2016 | Kasslin | .................. | H04L 41/12 |
| 9,888,439 B2* | 2/2018 | Kim | .................. | H04W 52/0229 |
| 9,913,159 B2* | 3/2018 | Hiremath | ............. | H04W 24/10 |
| 2005/0169233 A1* | 8/2005 | Kandala | ............... | H04B 1/7183 370/349 |
| 2005/0243782 A1* | 11/2005 | Sakoda | ................... | H04L 47/10 370/338 |
| 2008/0002632 A1* | 1/2008 | Pandey | ................ | H04W 48/12 370/338 |
| 2008/0002633 A1* | 1/2008 | Pandey | ................ | H04W 48/12 370/338 |

(Continued)

*Primary Examiner* — Hai V Nguyen
(74) *Attorney, Agent, or Firm* — Saile Ackerman LLC; Stephen B. Ackerman

(57) ABSTRACT

A method for estimating reception time of beacon signals includes receiving a beacon from a transmitting device, checking the real-time clock (RTC) of a receiving device, checking a timing synchronization function (TSF) of the received beacon, and estimating a reception time of a next beacon according to the RTC, TSF and a period of the beacon.

10 Claims, 6 Drawing Sheets

(56) References Cited

U.S. PATENT DOCUMENTS

| | | | | |
|---|---|---|---|---|
| 2008/0225768 | A1* | 9/2008 | Wentink | H04W 52/0216 370/311 |
| 2009/0097464 | A1* | 4/2009 | Sakoda | H04W 48/08 370/338 |
| 2010/0150095 | A1* | 6/2010 | Gandham | H04W 48/16 370/329 |
| 2011/0216658 | A1* | 9/2011 | Etkin | H04W 56/00 370/242 |
| 2011/0216660 | A1* | 9/2011 | Lee | H04J 3/06 370/252 |
| 2011/0222421 | A1* | 9/2011 | Jana | H04L 63/1441 370/252 |
| 2011/0231559 | A1* | 9/2011 | Yamaguchi | H04L 65/1069 709/228 |
| 2013/0044658 | A1* | 2/2013 | Zhu | H04W 56/0035 370/311 |
| 2013/0077546 | A1* | 3/2013 | Liu | H04W 52/0216 370/311 |
| 2013/0204962 | A1* | 8/2013 | Estevez | H04N 7/185 709/217 |
| 2013/0272455 | A1* | 10/2013 | HomChaudhuri | H04L 27/2647 375/340 |
| 2014/0024975 | A1* | 1/2014 | Little | A61N 7/02 601/3 |
| 2014/0065964 | A1* | 3/2014 | Turunen | H04W 8/005 455/41.2 |
| 2014/0148099 | A1* | 5/2014 | Reunamaki | H04W 52/0209 455/41.2 |
| 2014/0192785 | A1* | 7/2014 | Gong | H04W 56/001 370/336 |
| 2014/0211674 | A1* | 7/2014 | Hiremath | H04W 52/0216 370/311 |
| 2014/0237132 | A1* | 8/2014 | Yamaguchi | H04L 65/1069 709/228 |
| 2014/0321317 | A1* | 10/2014 | Kasslin | H04W 4/08 370/254 |
| 2014/0344490 | A1* | 11/2014 | Tsfaty | G06F 13/4286 710/106 |
| 2015/0200811 | A1* | 7/2015 | Kasslin | H04L 41/12 370/254 |
| 2015/0282079 | A1* | 10/2015 | Alon | H04W 52/0216 370/311 |
| 2015/0319555 | A1* | 11/2015 | Cordeiro | H04L 69/18 455/41.2 |
| 2015/0382283 | A1* | 12/2015 | Wang | H04W 52/0216 370/328 |
| 2016/0100311 | A1* | 4/2016 | Kumar | H04L 63/123 726/7 |
| 2016/0142988 | A1* | 5/2016 | Powell | H04W 56/00 370/338 |
| 2016/0165534 | A1* | 6/2016 | Kim | H04W 52/0229 370/311 |
| 2016/0277880 | A1* | 9/2016 | Passler | G01S 5/00 |
| 2016/0286388 | A1* | 9/2016 | Marin | H04L 63/0421 |
| 2016/0294713 | A1* | 10/2016 | Hiremath | H04W 24/10 |
| 2016/0360498 | A1* | 12/2016 | Knowles | H04W 56/001 |
| 2017/0086157 | A1* | 3/2017 | Abraham | H04W 56/004 |
| 2018/0249412 | A1* | 8/2018 | Zhou | H04W 52/0206 |
| 2018/0295595 | A1* | 10/2018 | Shellhammer | H04L 69/28 |
| 2018/0310133 | A1* | 10/2018 | Ramasamy | H04W 4/025 |
| 2019/0246966 | A1* | 8/2019 | Friedman | A61B 5/04017 |

* cited by examiner

FIG. 1 - Prior Art

METHOD AND RECEIVING DEVICE FOR ESTIMATING RECEPTION TIME OF BEACON SIGNAL

FIELD OF INVENTION

The present disclosure relates to a method for estimating reception time of beacon signal and a receiving device for estimating reception time of beacon signal.

BACKGROUND OF INVENTION

Wireless local area network (WLAN), which is one of developing wireless communication technology, is a technology for laptops, mobile devices, or other terminal stations (hereinafter, STAs) to link to the interact from home, company or WLAN server using wireless radio technology.

FIG. 1 illustrates a structure of 802.11 wireless local area network (WLAN) system which is created by Institute of Electrical and Electronics Engineers (IEEE).

IEEE 802.11 WLAN system includes a plurality of components which works mutually to provide STAs portable wireless local network. Basic service set (BSS), which is a basic component in IEEE 802.11, is assemble of STAs using the same radio frequency within a specific radius. FIG. 1 takes WLAN consists of BSS 101 and BSS 111 and one distribution system (DS) 121 as an example. A first BSS 101 includes one member STA 103. A second BSS 111 includes two members, STA113 and STA 115. DS 121 is connected to both first BSS 101 and second BSS 111. Access point (hereinafter AP) 131, 133 can receive STAs and can be view as a STA. That is, AP 131, 133 can transmit data between BSS and DS.

In the present disclosure, STAs can be terminals, wireless transceivers, user devices, mobile stations, portable terminals, user terminals, receiving devices, etc. AP can be a base station (BS), a node B, an evolved node B (eNodeB) in a WLAN system or any kind of access points connected between WLAN and the internet.

STAs and Aps in WLAN system have to be synchronized. Therefore, APs periodically or non-periodically transmit beacon signals so that STAs can implement synchronization with STAs according to the received beacon signals.

STAs need to scan channels before receiving and transmitting data in WLAN system. However, STAs keep consuming power when scanning channels. As a result, the power consumption in receiving mode is higher than transmitting mode. High power consumption in receiving mode makes usage time of STA become shorter because STAs usually utilize batteries as power source. Hence, if STAs keep scanning channels for remaining in receiving mode, power is wasted even no data transmission happens within WLAN system. To solve this problem, the power management (PM) modes of STAs in WLAN system require improvement.

PM modes can be divided into active mode and power save (PS) mode. STAs usually utilize active mode to remain in wake-up mode. Transmission and reception of signal frames or channel scanning can be implemented normally in wake-up mode. STAs switch between sleep mode and wakeup mode to save power consumption. STAs do not transmit nor receive signal frame and do not scan channel either.

The longer the time when the STA remain in sleep mode is, the less power loss of the battery is, and the usage time of STA becomes longer accordingly. However, STAs cannot receive and transmit signal frames in sleep mode, thus, it is impossible for STAs to always remain in sleep mode. If reception or transmission of signal frames is required, STAs have to switch to wake-up mode from sleep mode. However, if APs require to receive or transmit signal frames to STAs, STAs will be unable to transmit signal frames required by Aps in sleep mode and unable to know the requirement of receiving signal frames transmitted from Aps. In order to know whether the reception of signal frame transmitted from APs is required or not, STAB need to switch to wake-up mode from sleep mode in specific period. The specific period can be the period of beacon signals transmitted by APs. Thus, STAs need to estimate reception time of beacon signals precisely.

SUMMARY OF INVENTION

The object of the present disclosure is providing a receiving device which can precisely estimate the reception time of beacon signals in low power consumption.

The other object of the present disclosure is enhancing the successful reception proportion for receiving device to receive beacon signals from AP.

The other object of the present disclosure is reducing power consumption by precisely estimating the reception time of beacon signals.

The other object of the present disclosure is reducing affection cause by the time shift of the inner clock within AP.

The method for estimating reception time of beacon signals of the present disclosure includes: receiving a first beacon signal from a transmitting device, checking the real-time clock of a receiving device, checking the timing synchronization function (TSF) of the first beacon signal, and estimating the reception time of a next beacon signal according to the real-time clock, the TSF of the first beacon signal and a period of the first beacon signal.

The present disclosure further provides a receiving device for estimating reception time of beacon signals which includes a receiving block, a clock, and a control block. The receiving block receives a first beacon signal from a transmitting block. The control block checks a real-time clock of the receiving device, checks a timing synchronization function (TSF) of the first beacon signal, and estimates a reception time of a next beacon according to the real-time clock of the receiving device and the TSF of the first beacon signal.

According to the above-mention features, the embodiments of the present disclosure can reduce the failure of beacon signal reception.

According to the embodiments of the present disclosure, receiving device can precisely estimate the reception time of beacon signal so that await period, i.e. period for receiving device in wake-up mode, becomes shorter.

According to the embodiment of the present disclosure, the receiving device can reduce the failure of beacon signal reception and reduce the power consumption when keep the network accessible.

According to the embodiment of the present disclosure, the receiving device can tolerate larger time shift of real-time clock and the reception of beacon signals can be improved.

In addition, according to the embodiment of the present disclosure, the receiving device can extend the period of power-saving mode and reduce the affection, which may result in failure of beacon signals reception, caused from the time shift of inner real-time clock of the receiving device.

DETAILED DESCRIPTION OF PREFERRED EMBODIMENTS

The following context practically introduces parts of embodiments of the present disclosure accompanying with exemplifying drawings. It should he understood that the same reference numbers refer to the same components may be used in different drawings. If structures or functions of a component are well-known will not result in confusion even without any illustration, the detailed introduction will be omitted.

The terms first, second, A, B, (a), (b) are utilized to distinguish different components instead of limiting the arrangements or orders of the embodiments. When components are "comprised" or "included", it means the composition may include components which are not mentioned, that is, the composition is not exclusively composed by the mentioned components. Terms "unit", "module", etc. refer to a component which has at least one function or can deal with at least one process. The component can be hardware, software of the combination of hardware and software.

The present disclosure utilizes IEEE 802.11 system as an example of wireless local area network (WLAN) system. However, any WLAN system which can apply the method for estimating reception time of beacon signal or receiving devices for estimating reception time of beacon signal falls into the scope of the present disclosure.

Figure 1:
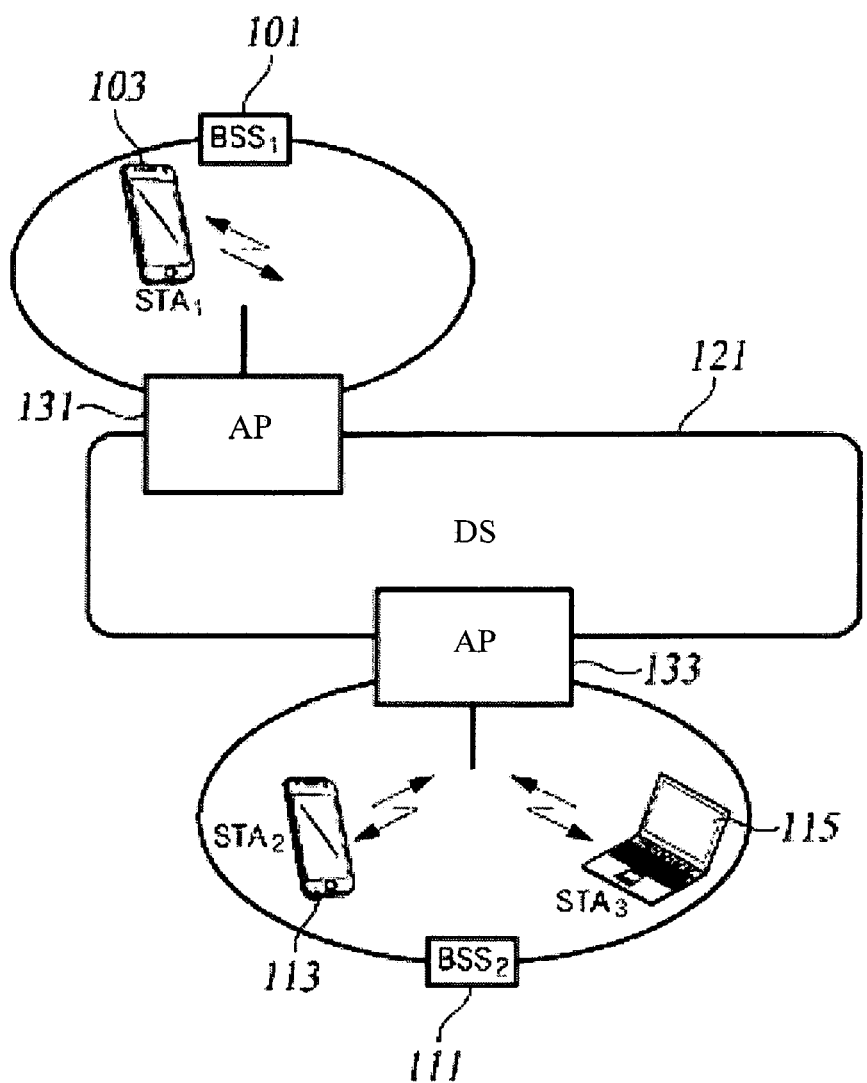
FIG. 1 illustrates a structure of 802.11 wireless local area network system created by Institute of Electrical and Electronics Engineers (IEEE 802.11 WLAN system).
Figure 2:
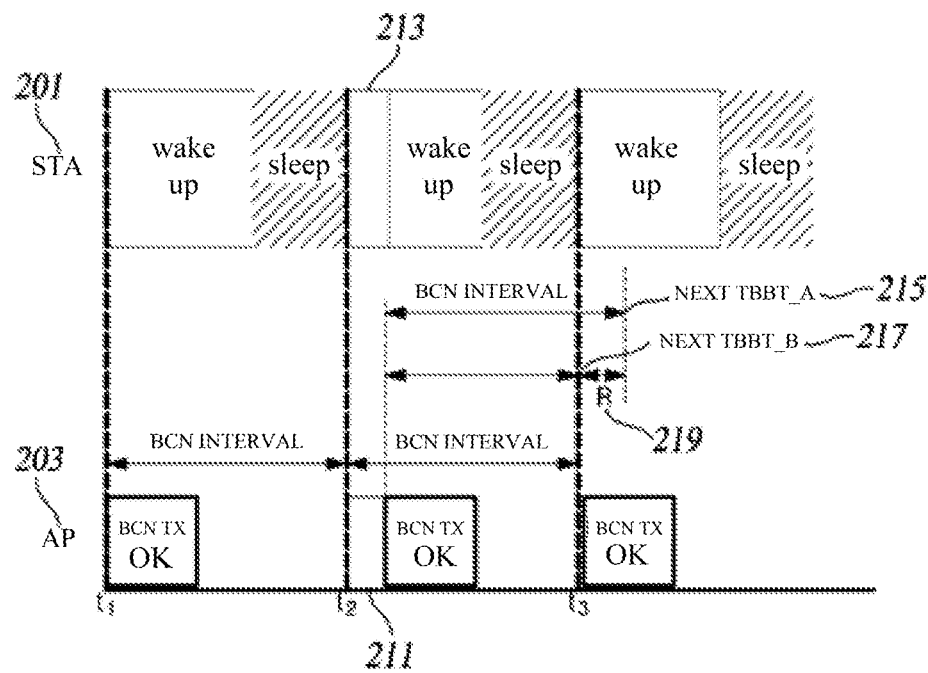
FIG. 2 illustrates reception time of beacon signals of a receiving device STA when transmission delay occurs on an AP.

FIG. 2 illustrates reception time of beacon signals of a station (STA) when delay happens on access point (AP).

Please refer to FIG. 2. AP 203 originally schedule to transmit beacon signals at predetermined time t1, t2, and t3. Time intervals between the predetermined times can be the period of beacon signal, i.e. interval of transmitting beacon signals (BCN Interval). However, AP203 may not transmit beacon signals due to various reasons. Hence, AP203 transmits beacon signals after delay time 211 following by predetermined time t2. Besides, transmitted beacon signals includes timing synchronization function (TSF) which can be utilized by STA 201 to synchronize with AP 203. Additionally, STA 201 utilized information of beacon signals to update network.

STA 203 switches to wake-up mode rom sleep mode periodically in order to receive beacon signals transmitted by AP 203. STA 201 analyze the received beacon signals in wake-up mode, if reception or transmission of data is required, STA 201 remains in wake-up mode, if not, STA 201 switches into sleep mode after estimating time for next wake-up. STA 201 requires reboot time 213 to switch into wake-up mode during the process of receiving beacon signals.

In general, STA 201 estimate reception time of next beacon signal, which is so-called target beacon transmission time (TBTT), according to the TSF and the period of beacon signals Which STA201 received earlier. However, the TSF of the beacon signals may include delayed time when transmission of beacon signals from AP203 is delayed. As a result, the reception time of the next beacon signal estimated by STA 201 may be incorrect because the reception time of the next beacon signal (i.e. TBTT) is estimated according to the TSF of previous beacon signals. The delay of the TSF of previously received beacon signals result in incorrect estimated reception time of next beacon signal, thus STA201 cannot successfully receive the next beacon signals. In order to avoid error cause by delay, STA201 utilize formula (1) to obtain remainder (R) by dividing TSF of the previously received beacon signals by the period of the beacon signal. The period of the beacon refer to the time interval of beacon signals.

$$\text{Next TBBT\_}B = [(\text{TSF of previously received beacon signals}) + (\text{period of beacon signals})] - (R) \quad \text{Formula (1)}$$

NEXT TBTT_B represents the reception time of the next beacon signal.

Figure 3:
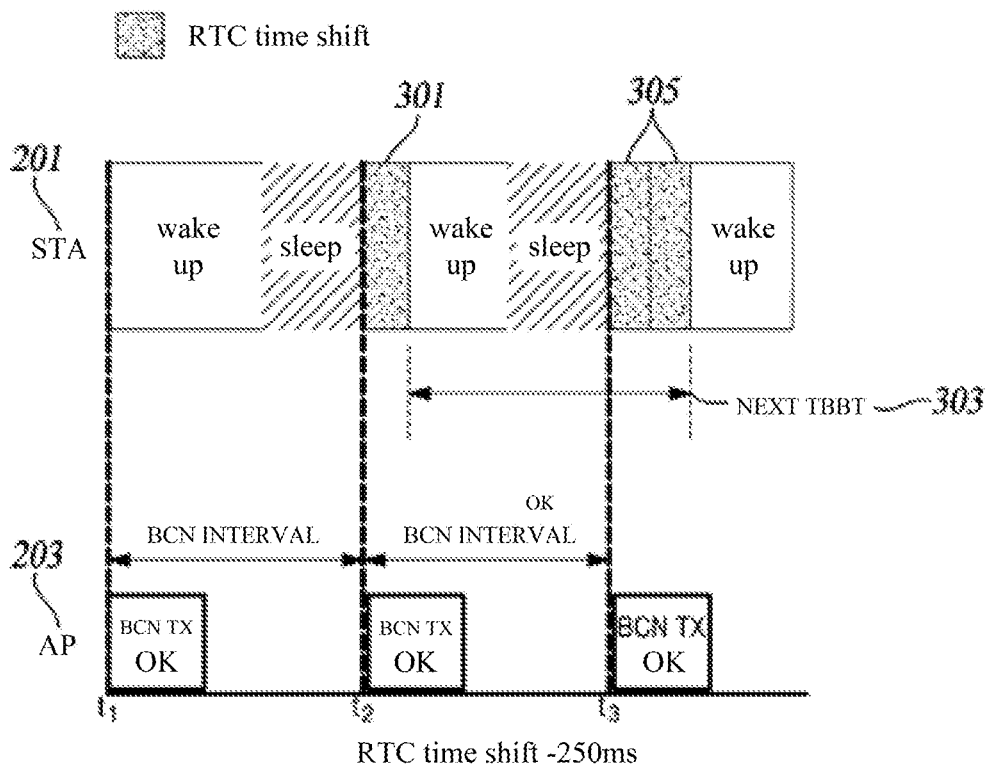
FIG. 3 illustrates reception time of beacon signals estimated by the receiving device STA when the receiving device STA has negative real-time clock (RTC) time shift.

FIG. 3 illustrates reception time for receiving device STA to receive beacon signals which have negative real-time clock (RTC) time shift.

FIG. 3 takes the RTC time shift of receiving device STA is −250 microseconds (μs) as an example to clarify the present disclosure. AP203 transmit beacon signals at predetermined time t1, t2 and t3. However, STA 201 switch into wake-up mode after time shift 301 following by predetermined time t2 due to the inner RTC time shift of STA 201. STA201 estimates the reception time of next beacon signal according to inner RTC of STA 201 thus the estimated reception time of the next beacon will be affected. STA201 switches into wake-up mode after accumulated time shift 305 following by the predetermined t3. As a result, the reception time of the next beacon signal (TBTT) will be mistakenly estimated as time 303, thus STA201 miss the time when AP203 transmits beacon signal and cannot receiving the beacon signals successfully. For example, the period (interval) of beacon signals is 3 seconds, the total delay is −750 μs.

Figure 4:
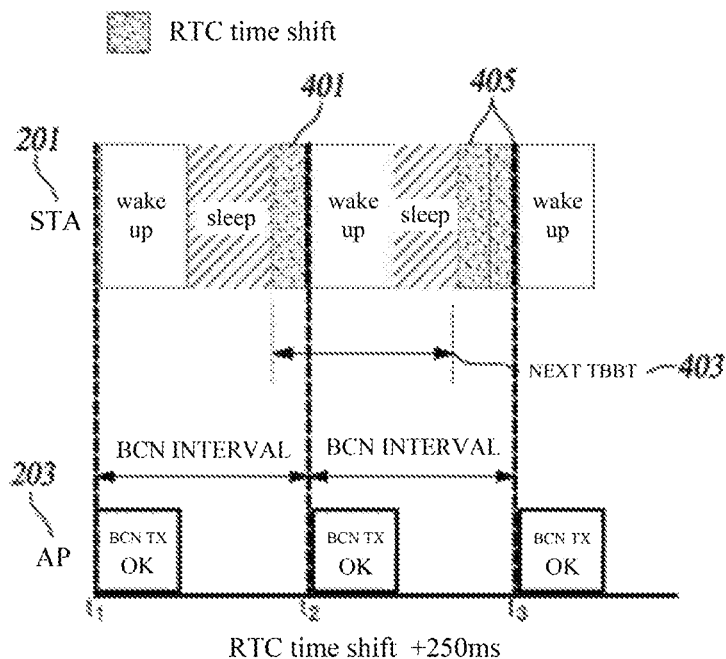
FIG. 4 illustrates reception time of beacon signals estimated by the receiving device STA when the receiving device STA has positive RTC time shit.

FIG. 4 illustrates reception time of beacon signals when the RTC of the receiving device STA has positive time shift.

FIG. 4 takes the time shift of the receiving device STA is +250 μs as an example. Similarly to FIG. 3, the only difference between FIG. 3 and FIG. 4 is the time difference change from negative to positive, thus the time for waking STA 201 up becomes earlier instead of later. STA201 will mistakenly estimate reception time of the next beacon signal (TBTT) is time 403. Take the period (interval) of beacon signals is 3 seconds as an example, the time shift 401 is 750 μs. The time shift 405 will accumulate longer due to the time shift of time shift of RTC accordingly to FIG. 3. If STA 201 keeps in power-saving mode for a long time, receiving device STA will be unable to receive beacon signals successfully due to the time shift of RTC.

Please illustrate reception time estimated by STA when both AP and receiving device STA have RTC time shift.

Figure 5:
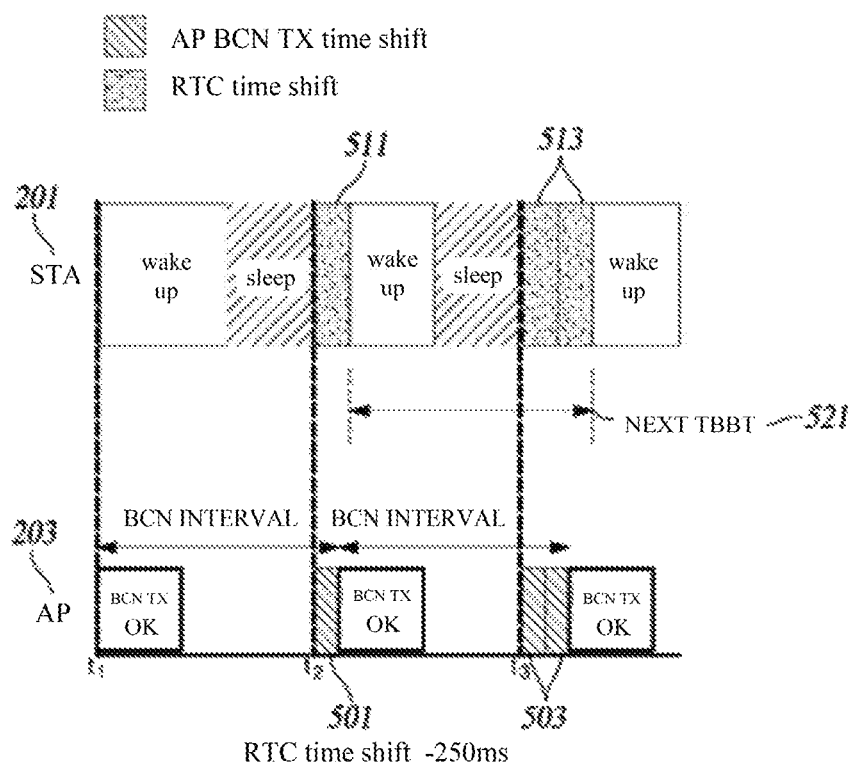
FIG. 5 illustrates reception time of beacon signals estimated by the receiving device STA when AP has transmission shift and receiving device STA has RTC time shift.

AP203 has inner clock as STA 201, therefore, transmission shift will occur on AP203 during transmission due to the time shift of RTC. Hereinafter, transmission shift refers to shift caused from the time shift of inner clock of transmitting device AP 203 during transmission. Please refer to FIG. 5, AP 203 transmit beacon signals at time 501 and 503 accompanied with transmission shift caused from inner clock time shift. The transmission delay of beacon signals caused from inner clock time shift accumulates with following of time.

STA 201 also has RTC time shift 511 and 513 cause from inner clock when STA 201 switches to wake-up mode from sleep mode. STA 201 and AP 203 execute in different time domain due to the inner clock time shift, thus, STA 201 and AP 203 cannot synchronize. As a result, it is impossible for STA 201 to receive beacon signals successfully at the estimated reception time of next beacon signal (TBTT) 521.

Figure 6:
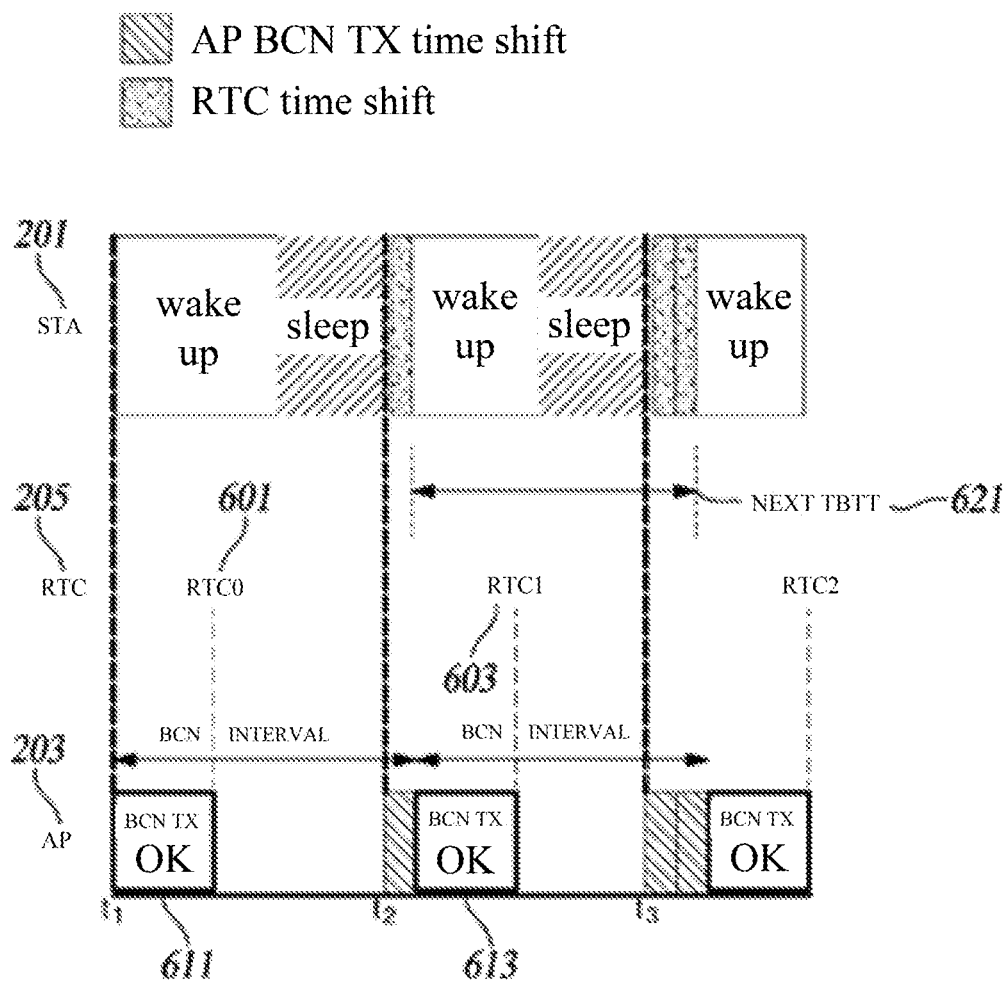
FIG. 6 illustrates reception time of beacon signals estimated by the receiving device STA of the present disclosure.

Please refer to FIG. 6 which illustrates the reception time of beacon signals of receiving device STA. AP203 transmits beacon signals with transmission shift caused from inner clock time shift as FIG. 5. Delay will occur on STA 201 when switch to wake-up mode from sleep mode due to the time shift of inner clock RTC 205.

In the present disclosure, STA 201 estimates the reception time of next beacon signal (TBTT) 621 according to the inner clock RTC ($RTC_0$ and $RTC_1$) 601 and 603, and according to the TSFs of the two continuous beacon signals 611 and 613 received previously. Inner clock RTC 601 and 603 can be the reception time of beacon signals 611 and 613 respectively. STA 201 utilizes formula (2) to calculate slope a according to the inner clock RTC 601 and 603 and the TSFs of the beacon signals 611 and 613 received previously. Then, STA 201 utilize the slope a and formula (3) to estimate the reception time of the next beacon signal (TBTT) 621.

$$a=(RTC_{N-1}-RTC_{N-2})/(TSF_{N-1}-TSF_{N-2}) \quad \text{Formula (2)}$$

$$\text{NEXT TBTT }(RTC_N)=(RTC_{N-1}\text{ or }TSF_{N-1})+a*\text{BCN interval} \quad \text{Formula (3)}$$

$RTC_{N-1}$ and $RTC_{N-2}$ represent the reception time of beacon signals 611 and 613. $TSF_{N-1}$ and $TSF_{N-2}$ represents the TSF of signals 611 and 613. BCN interval represents period or interval of beacon signals.

Take inner clock RTCs of STA 201 $RTC_0$ is 50 µs and $RTC_1$ is 100 µs, and TSF of beacon signal 611 is 200 µs and TSF of beacon signal 613 is 300 µs as an example. The slope a is (100−50)/(300−200)=0.5. Therefore, STA 201 estimates the reception time of the next beacon signal is 50 µs after the inner clock RTC 205 of STA 201. Hence, $RTC_2=RTC_1+$ a*BCN interval=100+50=150. The reception time of the next beacon signal is 150 µs.

Figure 7:
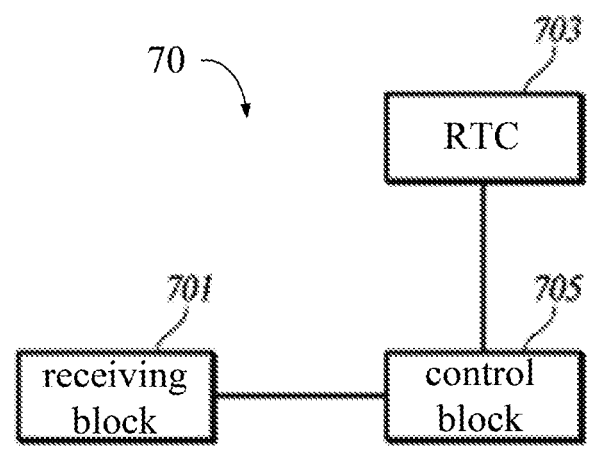
FIG. 7 illustrates a structure of the receiving device STA of the present disclosure.

FIG. 7 illustrates the structure of receiving device STA 70.

Please refer to FIG. 7. Receiving device STA 70 of the present disclosure includes receiving block 701, real-time clock (RTC) 703 and control block 705. The receiving block 701 and the RTC 703 do not have to isolate from control block 705 and can be intergraded into control block 705 in some embodiments.

The receiving block 701 receives beacon signals from Aps. RTC 703 is an inner clock of the receiving device 70. The control block 705 of the present disclosure is utilized to estimate the reception time of a next beacon signal (TBTT) according to the received beacon signals so that STA can wake-up from sleep mode when reception of beacon signals transmitted by APs is required.

Figure 8:
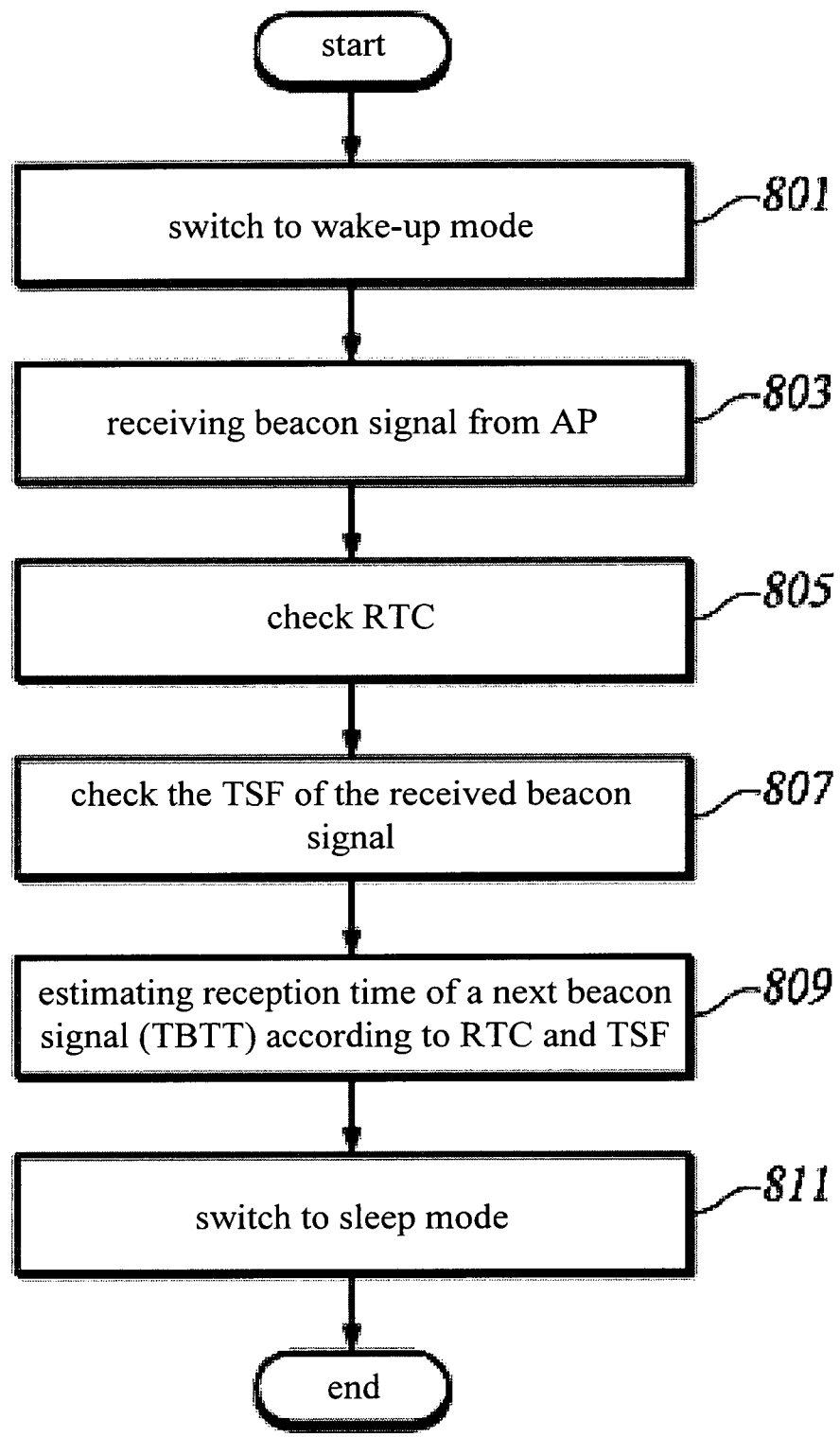
FIG. 8 illustrates a flow chart for the receiving device STA of the present disclosure to estimate reception time of beacon signals.

FIG. 8 illustrates the flow chart of the receiving device STA of the present disclosure.

According to FIG. 8, STA switches to wake-up mode into sleep mode(801).

STA receives beacon signals from AP(803). STA checks the RTC of inner clock. STA checks the TSF of received beacon signals. STA estimates the reception time of the next beacon signal (TBTT) (809). STA switches to wake-up mode from sleep mode (811).

To conclude, the above-mentioned embodiments are utilized to exemplify rather than limit the technology concept of the present disclosure. Any modification and variation Which can be completed by a skilled person in the art on the basis of the specification should fall into the scope of the claims protected by the present disclosure.

I claim:

1. A method for estimating reception time of beacon signals comprising:
   receiving a first beacon signal from a transmitting device;
   checking a real-time clock (RTC) of a receiving device;
   checking a timing synchronization function (TSF) of the first beacon signal; and
   estimating a reception time of a next beacon signal from the transmitting device according to the RTC of the receiving device, the TSF of the first beacon signal, and a period of the first beacon signal.

2. The method for estimating reception time of beacon signals according to claim 1, wherein the reception time of the next beacon signal is time for the receiving device to switch to a wake-up mode from a sleep mode.

3. The method for estimating reception time of beacon signals according to claim 2 further comprising: estimating the reception time of the next beacon signal according to the period of the first beacon signal, a reception time of a second beacon signal, a TSF of the second beacon signal, a reception time of a third beacon signal, a TSF of the third beacon signal, the RTC of the receiving device, and the TSF of the first beacon signal, wherein the second beacon signal and the third beacon signal are two beacon signals received by the receiving device prior to the first beacon signal.

4. The method for estimating reception time of beacon signals according to claim 3 further comprising: estimating, by a first formula and a second formula, the reception time of the next beacon signal according to the period of the first beacon signal, a reception time of the second beacon signal, the TSF of the second beacon signal, a reception time of the third beacon signal, and the TSF of the third beacon signal;
   wherein the first formula is $a=RTC_{N-1}-RTC_{N-2})/(TSF_{N-1}-TSF_{N-2})$;

the second formula is the reception time of the next beacon signal= $(RTC_{N-1}$ or $TSF_{N-1})+a*$(the period of the first beacon signal), wherein $RTC_{N-1}$ is the reception time of the second beacon signal, $RTC_{N-2}$ is the reception time of the third beacon signal, $TSF_{N-1}$ is the TSF of the second beacon signal, and $TSF_{N-2}$ is the TSF of the third beacon signal.

5. The method for estimating reception time of beacon signals according to claim 1, wherein the receiving device switches to a wake-up mode from a sleep mode at the reception time of the next beacon.

6. A receiving device for estimating reception of beacon signals, comprising:
   a receiving block configured to receive a first beacon signal from a transmitting device;

a clock; and a control block configured to check a real-time clock (RTC) of the receiving device and a timing synchronization function (TSF) of the first beacon signal, and configured to estimate a reception time of a next beacon signal from the transmitting device according to the RTC of the receiving device, the TSF of the first beacon signal, and a period of the first beacon signal.

7. The receiving device for estimating reception time of beacon signals according to claim 6, wherein the receiving device switches to a wake-up mode from a sleep mode at the reception time of the next beacon.

8. The receiving device for estimating reception time of beacon signals according to claim 7, wherein the control block estimates the reception time of the next beacon signals according to the period of the first beacon signal, a reception time of a second beacon signal, a TSF of the second beacon signal, a reception time of a third beacon signal, a TSF of the third beacon signal, the RTC of the receiving device, and the TSF of the first beacon signal, wherein the second beacon signal and the third beacon signal are two beacon signals received by the receiving device prior to the first beacon signal.

9. The receiving device for estimating reception time of beacon signals according to claim 8, wherein the control block estimates, by a first formula and a second formula, the reception time of the next beacon signal according to the period of the first beacon signal, a reception time of the second beacon signal, the TSF of the second beacon signal, the reception time of the third beacon signal, and the TSF of the third beacon signal, wherein the first formula is $$a=(RTC_{N-1}-RTC_{N-2})/(TSF_{N-1}-TSF_{N-2});$$

the second formula is the reception time of the next beacon signal= $(RTC_{N-1}$ or $TSF_{N-1})+a*$(the period of the first beacon signal), wherein $RTC_{N-1}$ is the reception time of the second beacon signal, $RTC_{N-2}$ is the reception time of the third beacon signal, $TSF_{N-1}$ is the TSF of the second beacon signal, and $TSF_{N-2}$ is the TSF of the third beacon signal.

10. The receiving device for estimating reception time of beacon signals according to claim 6, wherein the control block switches to a wake-up mode from a sleep mode at the reception time of the next beacon.

* * * * *